United States Patent
Kozerski

[11] Patent Number: 5,803,462
[45] Date of Patent: Sep. 8, 1998

[54] MLS GASKET WITH YIELDABLE COMBUSTION SEAL

[75] Inventor: Richard J. Kozerski, Lisle, Ill.

[73] Assignee: Dana Corporation, Toledo, Ohio

[21] Appl. No.: 761,154

[22] Filed: Dec. 6, 1996

[51] Int. Cl.⁶ .................................................. F16J 15/12
[52] U.S. Cl. .................................................. 277/235 B
[58] Field of Search ................. 277/1, 180, 235 B, 277/9

[56] References Cited

U.S. PATENT DOCUMENTS

| | | | |
|---|---|---|---|
| 4,372,564 | 2/1983 | Nicholson | 277/235 B |
| 4,376,539 | 3/1983 | Baldacci | 277/235 B |
| 4,480,844 | 11/1984 | Kozerski | 277/235 B |
| 4,605,236 | 8/1986 | Tsuchihashi et al. | 277/235 B |
| 4,620,710 | 11/1986 | Lambert et al. | 277/235 B |
| 5,092,613 | 3/1992 | Udagawa | 277/235 B |
| 5,201,534 | 4/1993 | Miyaoh | 277/235 B |
| 5,221,097 | 6/1993 | Ishikawa et al. | 277/235 B |
| 5,255,926 | 10/1993 | Udagawa | 277/235 B |
| 5,275,139 | 1/1994 | Rosenquist | 123/193 B |
| 5,277,433 | 1/1994 | Ishikawa | 277/235 B |
| 5,341,779 | 8/1994 | Chen et al. | 277/235 B |

FOREIGN PATENT DOCUMENTS

| | | | |
|---|---|---|---|
| 2057700 | 9/1992 | Canada | 277/235 B |
| 3720838 | 1/1989 | Germany | 277/235 B |

*Primary Examiner*—Scott Cummings
*Attorney, Agent, or Firm*—Rader, Fishman & Grauer PLLC

[57] ABSTRACT

An improved multi-layer gasket for an internal combustion engine comprises a central carrier plate and at least two surface plates disposed on opposing sides of the central carrier plate. The surface plates include a bead portion annularly located about combustion bore openings. A yieldable combustion seal ring is located radially inwardly of the bead portions, and bonded along an inner peripheral edge of the combustion bore openings at a discrete number of highly localized points by means of an elastomeric adhesive or by welding.

16 Claims, 2 Drawing Sheets

MLS GASKET WITH YIELDABLE COMBUSTION SEAL

FIELD OF THE INVENTION

The present invention relates to a metal laminate cylinder head gasket for an internal combustion engine. More particularly, the invention relates to a multi-layer metal cylinder head gasket having a yieldable sealing ring about a combustion chamber opening in combination with sealing beads disposed on surface plates positioned radially outwardly from the yieldable sealing ring.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing. A cylinder head gasket bears the load from a bolted connection of the mechanical components and relies upon that load to provide both the combustion and fluid flow seals.

In a metal laminate gasket for an internal combustion engine, the gasket is formed from a plurality of metal plates laminated together. The metal plates provide structural support within the joint between the cylinder head and engine block, and provide radial strength to resist gasket blow-out due to pressure from the combustion chamber.

Known gaskets use any of several types of combustion seals. One type, known as a flanged combustion seal ring, is essentially comprised of a wire, having a generally circular cross-sectional area. The wire may be inserted within an open end of a U-shaped flange with opposing legs of the flange engaging opposite faces of a main gasket body about the combustion opening. A clamping load is applied to the flanged portion of the gasket at the point of contact, deforming the ring's circumference to seal out combustion gases. Using such a configuration, the clamping load required to seal against combustion gases is typically higher because the force is distributed between the ring and flange, and may tend to promote undesirable gasket and engine-block distortion.

Further, both the flanged combustion opening and the separate wire ring are subject to thermal deformation which produces additional plastic deformation that tends to occur under high temperature operation during the life of the ring. Thermal deformation may result in premature gasket failure. The flange is also subject to failure along the U-shaped bends due to compression fatigue and environmental conditions.

Another type of combustion seal relies on a floating yieldable ring installed separately from the gasket. The floating ring is installed within a channel formed about the combustion chamber hole. A force applied to such a ring is concentrated at the point of contact, deforming the ring's circumference to effectively seal out combustion gases. However, such a seal ring must be separately installed, and may migrate prior to being subject to a clamping load, resulting in an imperfect seal. Additionally, the channel receiving the ring must be separately machined in the engine block to accommodate the ring, complicating gasket manufacture.

SUMMARY OF THE INVENTION

The present invention is directed to a cylinder head gasket of an internal combustion engine having at least one cylinder bore opening. The gasket is clamped between a cylinder head and an engine block.

A combustion seal for the cylinder head gasket comprises a central carrier plate and at least two surface plates disposed on opposing sides of the central carrier plate. The surface plates include a bead portion annularly located about the combustion openings. A yieldable combustion seal ring is located radially inwardly of the bead portions, and is disposed along an inner peripheral edge of a combustion opening formed in the multi-layer gasket. The yieldable ring is bonded along the inner periphery at a discrete number of highly localized points by means of an elastomeric adhesive or by welding. The bond locations preferably maintain an air gap between the outer periphery of the ring and the inner periphery of the combustion opening prior to gasket installation.

The inventive gasket provides special advantages when used in heavy-duty diesel engines having a cast-iron liner which protrudes above the engine block. When an engine is assembled, the gasket is placed between the engine cylinder head and block such that the yieldable combustion seal ring is oriented about the combustion chamber. As the bolts connecting the cylinder head and block are tightened, the load placed on the gasket increases. Because the yieldable combustion seal ring has a thickness greater than the thickness of the multiple layers adjacent the combustion opening, higher surface pressure is generated on the yieldable combustion seal, resulting in higher sealing stresses about the combustion chamber. Further, because the combustion ring is yieldable, it deforms to accommodate variations between the sealing surfaces, especially on the cylinder liner, resulting in a particularly tight seal. As the ring deforms, it fills the gap between the outer circumference of the ring and the inner periphery of the combustion opening in the gasket. Installation loading may fracture the localized bonding points. However, the ring deforms to directly contact the inner periphery of the combustion opening of the gasket, thereby receiving radial support from the multiple layers of the gasket.

The beaded section of the gasket, oriented about the combustion chamber opening radially outwardly of the yieldable combustion seal, substantially flattens and provides a secondary seal of combustion gases and prevents engine coolant from entering the combustion chamber.

Transportation of the inventive gasket is simplified because the seal ring is bonded directly to the carrier plate. Further, the bond fixes the seal ring at a predetermined spacing relative to the carrier plate. Thus, placement of the carrier plate also properly locates the seal ring relative to the carrier plate without expensive machining of the engine block. Additionally, alternative means of fastening the ring to the carrier plate, such as a U-shaped flange, are not required. Since the combustion seal comprises a single piece, the clamping load to provide a desired seal is greatly reduced when compared to more conventional gaskets. Lower clamping loads reduce bore distortion and improve engine performance.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
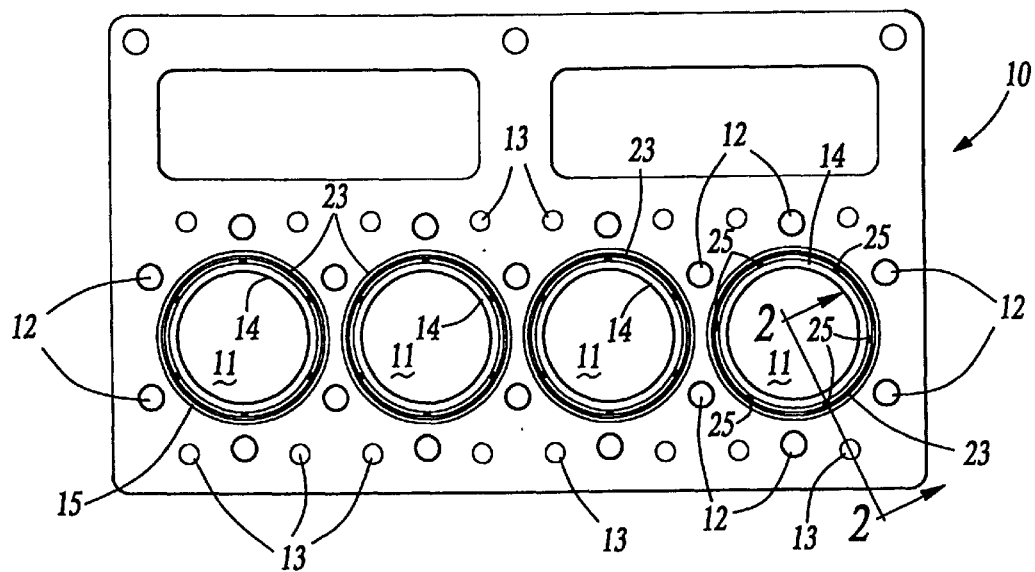
FIG. 1 is a perspective view of a metal gasket of the present invention.

A cylinder head gasket 10 is shown in FIGS. I through 4 in a relaxed state. As shown in FIG. 1, the gasket 10 includes a plurality of combustion chamber holes 11 in combination with bolt holes 12 and service holes 13. Service holes 13 allow flow of lubricant or coolant between the cylinder head and engine block. To seal the cylinder bores of an internal combustion engine, gasket 10 has an annular yieldable combustion seal ring 14 in combination with beads 15, where ring 14 is disposed radially inwardly of beads 15.

Figure 2:
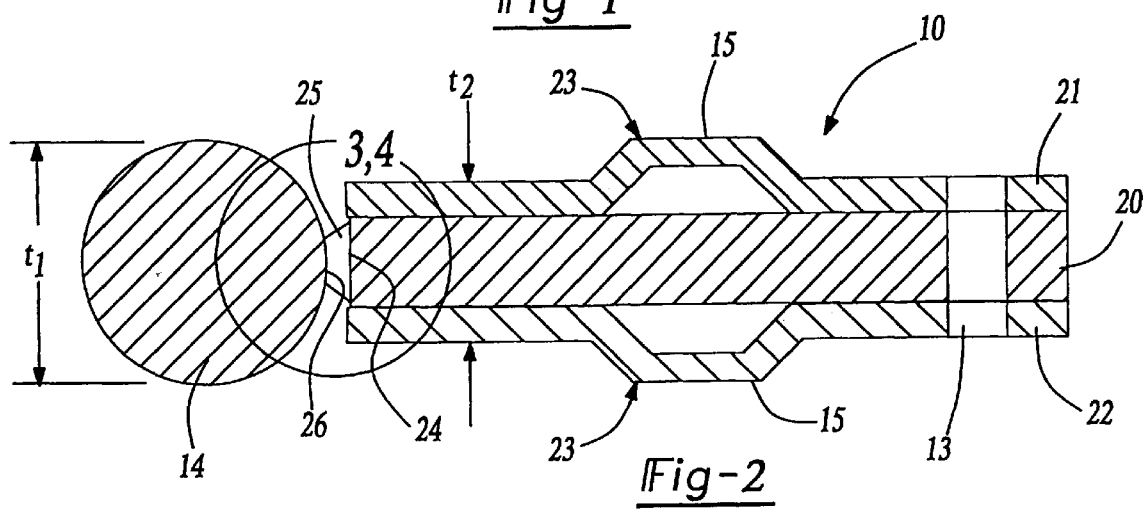
FIG. 2 is a cross-sectional view of a portion of the gasket in a relaxed state along lines 2—2 in FIG. 1.

The construction of gasket 10 about the combustion chamber is shown in further detail in FIG. 2. Gasket 10 comprises a central carrier plate 20 and at least two surface plates 21 and 22 disposed on opposing sides of central carrier plate 20. Plate 21 is laminated to an upper surface of central carrier plate 20, while plate 22 is laminated to a lower surface of central carrier plate 20. The surface plates 21, 22 include an outwardly extending bead portion 23 positioned annularly about the combustion opening, forming outwardly extending beads 15. Ring 14 has a thickness "t1" greater than a corresponding thickness "t2" of the combined carrier plate 20 and opposing plates 21, 22 adjacent combustion opening 11 forming an inner peripheral edge 24.

Figure 3:
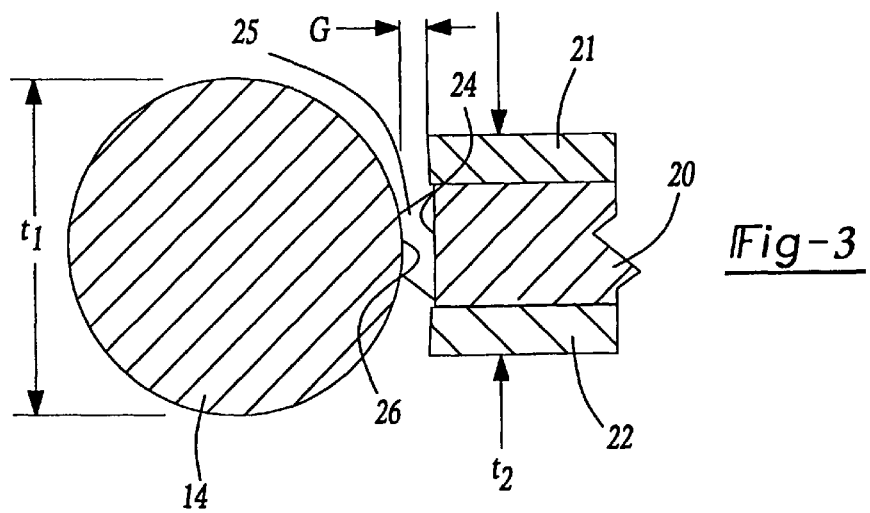
FIG. 3 is an amplified view showing detail contained in circle 3,4 of FIG. 2.
Figure 4:
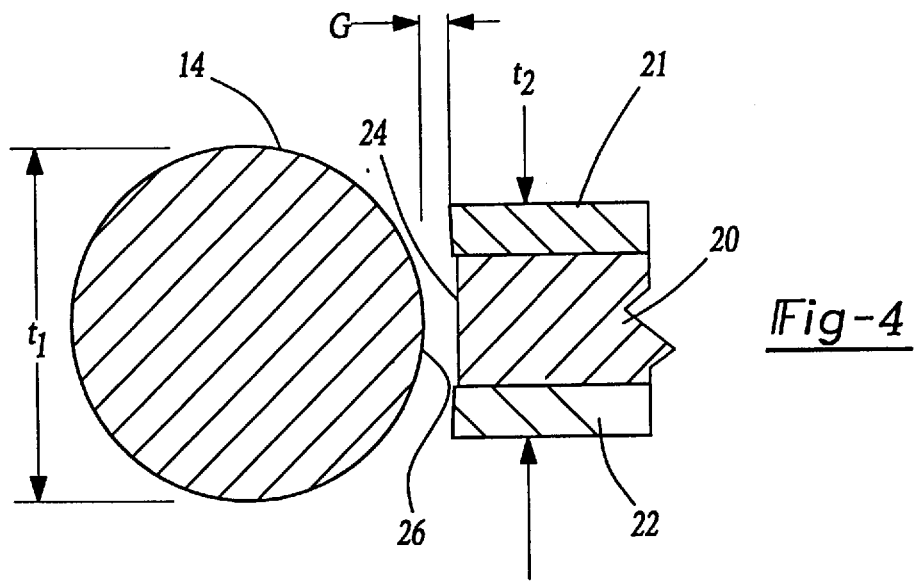
FIG. 4 is an amplified view showing alternative detail contained in circle 3,4 of FIG. 2 at a different circumferential location about a combustion chamber hole.
Figure 5:
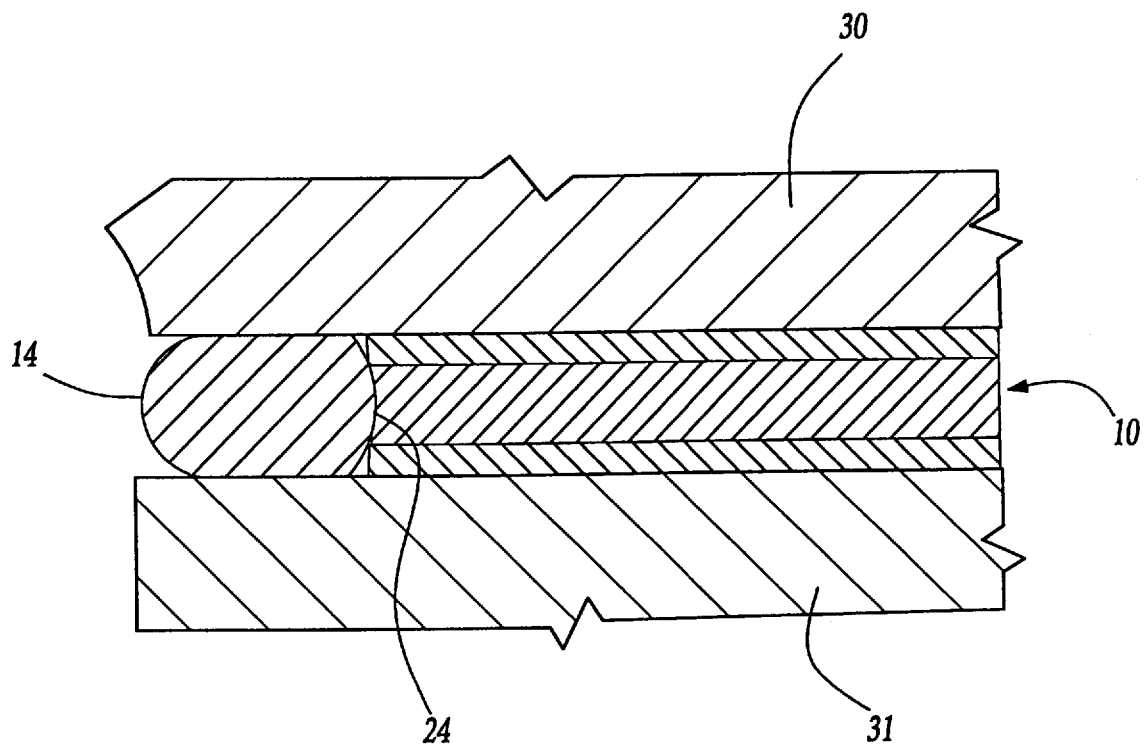
FIG. 5 is a cross-sectional view of the gasket of FIG. 2 installed between a cylinder head and engine block.

As best shown in FIGS. 3 and 4, ring 14 is bonded to peripheral edge 24 of combustion opening 11 at a discrete number of highly localized points by means of an adhesive or welding 25. The bond locations preferably maintain an air gap "G" between an outer periphery 26 of seal 14 and edge 24 prior to gasket installation, as best shown in FIG. 4. Preferably, the number of localized points of bonding 25 between ring 14 and edge 24 are equally spaced about the circumferential extent of combustion chamber hole 11. The number of bonding points is typically no less than three nor more than ten. Most preferably, the number of localized bonds 25 numbers approximately six locations. The extent of gap "G" is a direct function of bonds 25. The size of gap "G" varies by engine design because the gap "G" allows for proper compression of seal 14. As illustrated in FIG. 5, upon proper compression of seal ring 14, gap "G" should essentially disappear despite the existence of bonds 25. Because bonds 25 are highly localized, the majority of the outer circumference of ring 14 does not contact bonds 25. More particularly, gap "G" disappears when ring 14 is compressed between an engine head 30 and an engine block 31. When gasket 10 is clamped into place between head 30 and block 31, ring 14 contacts the head and block first because of the greater thickness of ring 14, resulting in high clamping pressure. Because of the high clamping pressure, ring 14 provides a very high sealing stress level. Further, because ring 14 is yieldable in nature, it deforms to accommodate any slight variations in the adjacent cylinder liner protrusions (not shown) and any variations between the sealing surfaces, resulting in better seal conformability. As ring 14 compresses, the outer circumference of ring 14 expands to fill gap "G", providing direct contact between the outer circumference of ring 14 and edge 24. Bonds 25 may fracture upon compression as ring 14 deforms to directly contact the inner periphery 24 of the combustion opening of the gasket. However, the fracture of bonds 25 after seal installation will not affect the integrity of the combustion seal. Upon installation, ring 14 is supported by edge 24 in a radial direction, increasing resistance against gasket blowout due to high pressures of combustion generated within the engine.

The design of gasket 10 depends to a large extent upon the specific application being considered, and may be adjusted in various ways. For example, the number of plates, the selection of materials, and the bead patterns are all functions of particular engine designs and may be varied accordingly. In some circumstances, the thickness of the yieldable combustion ring 14 may be reduced to a thickness less than that of carrier plate 20 and beads 15 of plates 21, 22. Ring 14 may even be reduced to less than thickness "t2" of carrier plate 20 and plates 21, 22 to accommodate cylinder liner protrusion.

The composition of the yieldable combustion seal is also a function of engine design. The yieldable combustion ring 14 is usually metallic. It can be formed from carbon steel, stainless steel, beryllium-copper alloys, or any other material having the requisite material properties. In general, however, carrier plate 20 and surface plates 21, 22 are composed of more rigid material than is ring 14. One preferred material is steel.

Additionally, by having yieldable combustion seal ring 14 bonded along an inner peripheral edge 24 on gasket 10, the need for any additional or alternative attachment means, such as a U-shaped flange, is obviated without affecting transportability of the assembled gasket. Instead of a separate seal ring which is added to the assembly at installation, ring 14 remains attached to and may be transported with carrier plate 20 before installation. Further, the pre-installation position of ring 14 is fixed by bonds 25 at a predetermined spacing relative to carrier plate 20. Thus, placement of carrier plate 20 also properly locates seal ring 14 relative to carrier plate 20 without expensive machining of the engine block, and without the use of a U-shaped flange. Moreover, since seal 14 does not require a U-shaped flange, the clamping load necessary to provide a desired seal is greatly reduced when compared to more conventional gaskets which require greater clamping loads to achieve the required sealability. Lower clamping loads reduce bore distortion and improve engine performance.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A multi-layer cylinder head gasket of an internal combustion engine having at least one cylinder bore opening, the cylinder head gasket comprising:
   a central carrier plate, said carrier plate having an upper and a lower surface;
   an upper plate located adjacent said carrier plate upper surface;
   a lower plate located adjacent said carrier plate lower surface;
   said carrier plate and said upper and lower plates each having a radially inner edge forming said cylinder bore opening;
   a yieldable wire ring having a radially outer circumference, said wire ring directly bonded at a plurality of localized points along said radially outer circumference to only said inner edge of said carrier plate about said cylinder bore opening when said gasket is in a relaxed state.

2. A cylinder head gasket as recited in claim 1, wherein said bond comprises one of an elastomer and a weld.

3. A cylinder head gasket as recited in claim 1, wherein said outer circumference is dimensioned to leave a gap between said outer circumference and said cylinder bore opening when said gasket is in a relaxed state.

4. A cylinder head gasket as recited in claim 1, wherein said points are equally circumferentially spaced along said radially outer circumference.

5. A cylinder head gasket as recited in claim 4, wherein said points number between three and ten.

6. A cylinder head gasket as recited in claim 5, wherein said points number approximately six.

7. A cylinder head gasket as recited in claim 1, wherein said upper plate is laminated to said upper surface of said carrier plate and said lower plate is laminated to said lower surface of said carrier plate, said plates further including bead portions disposed radially outwardly of said inner edge.

8. A cylinder head gasket as recited in claim 7, wherein said ring has a thickness greater than a combined thickness of said plates.

9. A multi-layer cylinder head gasket of an internal combustion engine having at least one cylinder bore opening, the cylinder head gasket comprising:

a central carrier plate, said carrier plate having an upper and a lower surface and a thickness therebetween; and an upper plate located adjacent said carrier plate upper surface;

a lower plate located adjacent said carrier plate lower surface;

said carrier plate and said upper and lower plates each having a radially inner edge forming said cylinder bore opening;

a yieldable wire ring having a radially outer circumference and a thickness greater than said thickness of said carrier plate, said wire ring directly bonded at a plurality of localized points along said radially outer circumference to only said inner edge of said carrier plate about said cylinder bore opening when said gasket is in a relaxed state.

10. A cylinder head gasket as recited in claim 9, wherein said bond comprises one of an elastomer and a weld.

11. A cylinder head gasket as recited in claim 9, wherein said outer circumference is dimensioned to leave a gap between said outer circumference and said inner edge when said gasket is in a relaxed state.

12. A cylinder head gasket as recited in claim 11, wherein said points are equally circumferentially spaced along said outer circumference.

13. A cylinder head gasket as recited in claim 12, wherein said points number between three and ten.

14. A cylinder head gasket as recited in claim 13, wherein said points number approximately six.

15. A multi-layer cylinder head gasket of an internal combustion engine having at least one cylinder bore opening, the cylinder head gasket comprising:

a central carrier plate, said carrier plate having an upper and a lower surface;

an upper plate and a lower plate, said carrier plate and said upper and lower plates each having a radially inner edge forming said cylinder bore opening, wherein said upper plate is laminated to said upper surface of said carrier plate and said lower plate is laminated to said lower surface of said carrier plate, said upper plate and said lower plate in combination with said carrier plate defining a thickness of said gasket along said radially inner edge, said plates including bead portions disposed radially outwardly of said inner edge; and a yieldable wire ring, said wire ring having a radially outer circumference and a thickness greater than said thickness of said plates, said outer circumference dimensioned to leave a gap between said outer circumference and said cylinder bore opening when said gasket is in a relaxed state, said wire ring directly bonded to only said inner edge of said carrier plate about said cylinder bore opening when said gasket is in a relaxed state, said bond limited to a plurality of localized points along said radially outer circumference, said points equally circumferentially spaced about said radially outer periphery.

16. A cylinder head gasket as recited in claim 15, wherein said bond comprises one of an elastomer and a weld.

\* \* \* \* \*